May 11, 1965

J. D. GOODELL ETAL 3,182,813

ARTICLE MANIPULATOR APPARATUS

Filed Aug. 13, 1962

INVENTORS
JOHN D. GOODELL
BY JOSEPH NAZALI
TORSTEN N. TENGSATER

Pennie Edmonds Morton Barrows Taylor
ATTORNEYS

INVENTORS
JOHN D. GOODELL
JOSEPH NAZALI
TORSTEN N. TENGSATER
BY
Pennie Edmonds Morton Barrows & Taylor
ATTORNEYS

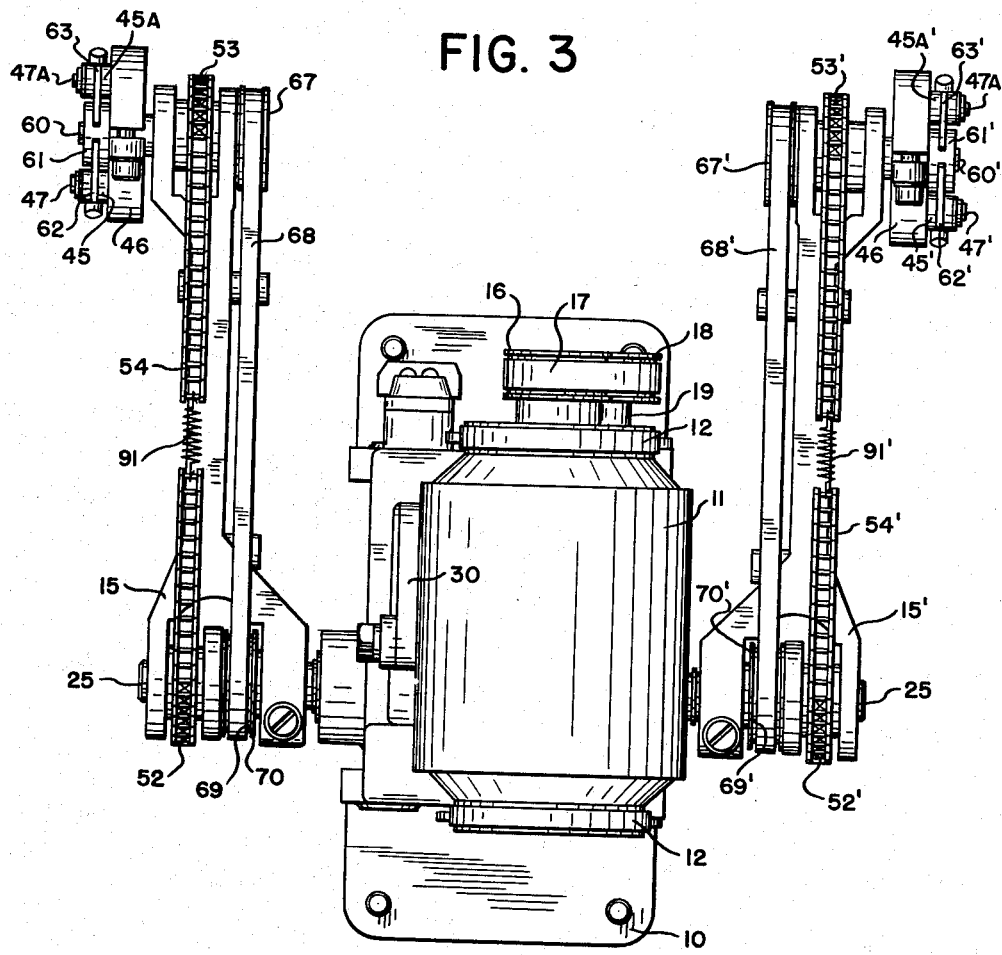

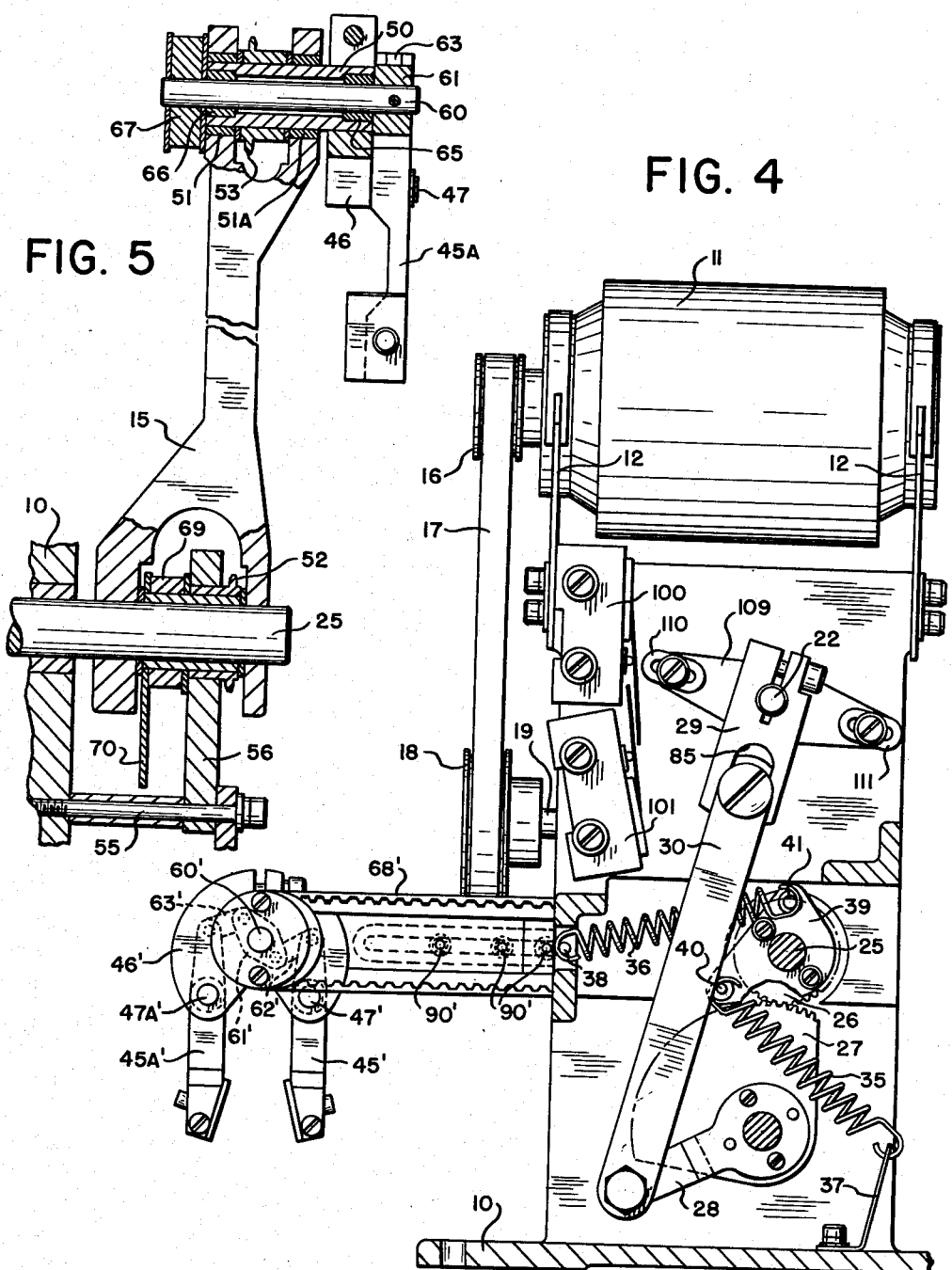

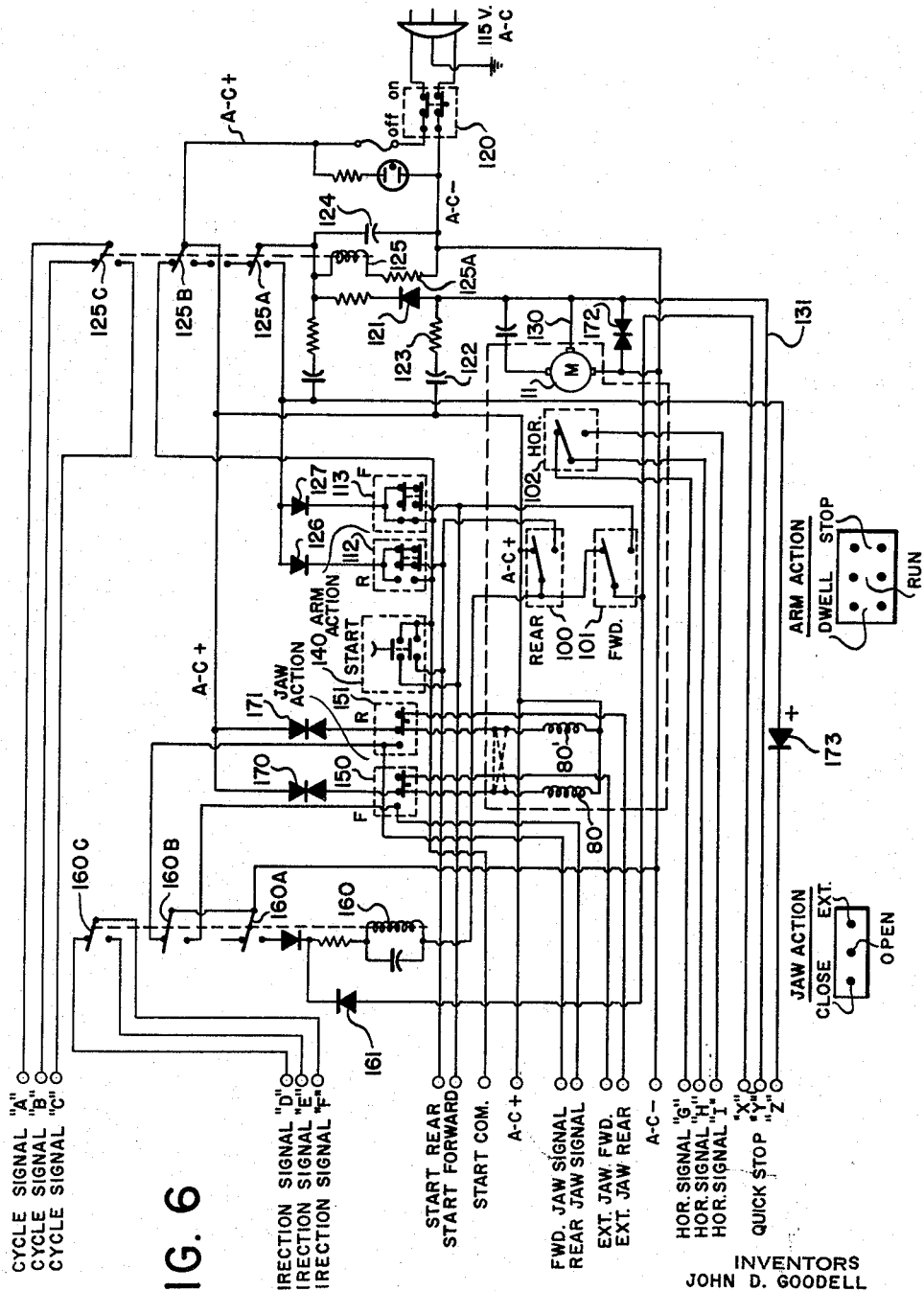

3,182,813
ARTICLE MANIPULATOR APPARATUS
John D. Goodell, Silver Spring, and Joseph Nazali and Torsten N. Tengsater, Takoma Park, Md., assignors to U.S. Industries, Inc., New York, N.Y., a corporation of New York
Filed Aug. 13, 1962, Ser. No. 216,626
9 Claims. (Cl. 214—1)

The present invention relates to article manipulator apparatus and more particularly to apparatus which is adapted to automatically pick up individual articles at a given delivery station, and transfer the individual articles to a second station either on an aperiodic or a periodic basis.

The apparatus provided by the present invention is particularly useful for automatically transferring individual pre-oriented component parts from a parts feeder, for example, to a work station in an automatic assembly operation. The present apparatus is simple in structure, precise in its ability to repetitively pick up, transfer and place down components, and versatile in its ability to function cooperatively on a programmed basis with a variety of other machines as either a controlled slave machine or as a controlling master.

The present manipulator apparatus may be integrated into an automated assembly system as a component in an open-loop control circuit whereby the manipulator apparatus may either produce the necessary electrical control signals to control the sequence of assembly steps carried out by cooperating assembly machines, and/or it may receive electrical function control signals from cooperating machines and operate as a slave controlled device.

It is a principal object of the present invention to provide versatile and reliable automatic manipulator apparatus having a minimum number of electrical and mechanical components.

In accordance with the present invention, manipulator apparatus is provided, having at least one transfer arm but preferably a plurality of arms pivotally mounted on a drive shaft in a base support and driven to travel through an arcuate path or paths of travel generally defined within a vertical plane or parallel vertical planes. A set of grasping jaws is mounted at the end of each pick-up arm and means are provided for maintaining the jaws in a fixed predetermined alignment position throughout the transfer path of travel. Means are also provided for actuating the grasping jaws at any desired arm position in the arcuate path of travel without disturbing the alignment axis of the jaws.

Although the invention is described by referring to illustrations showing manipulator devices having two operating arms, it is understood that a desired plurality of arms may be operatively combined to proportionately increase the operating transfer rate.

The transfer arm drive system is electrically controlled as are the jaw actuator mechanisms, and switch controlled circuits are provided for stopping and starting the arm travel with time coordinated command signals from cooperating machines and also for closing or relaxing the grasping jaws, independently of one another, at any desired position throughout the arcuate path of travel.

The drive mechanism is advantageously arranged to move the transfer arms through the arcuate path of travel in harmonic motion so that the travel velocity of the arms and grasping jaws approaches zero at each end of the travel path thereby minimizing vibration (without use of damping devices) and enhancing positioning accuracy. Machines constructed in accordance with the present invention are capable of rapidly transferring and positioning parts within a position tolerance of 0.003 inch.

The foregoing and other features and advantages of the invention will be apparent from the following description of a preferred embodiment of the invention, as illustrated in the accompanying drawings in which:

FIG. 3 is a top plan view of the apparatus shown in FIGS. 1 and 2;

FIG. 4 is a partial sectional view showing a portion of the drive mechanism;

FIG. 5 is an enlarged sectional view of the transfer arm and grasping fingers; and FIG. 6 is a schematic diagram of the electrical control circuit for the manipulator apparatus shown in FIGS. 1–5.

Figure 1:
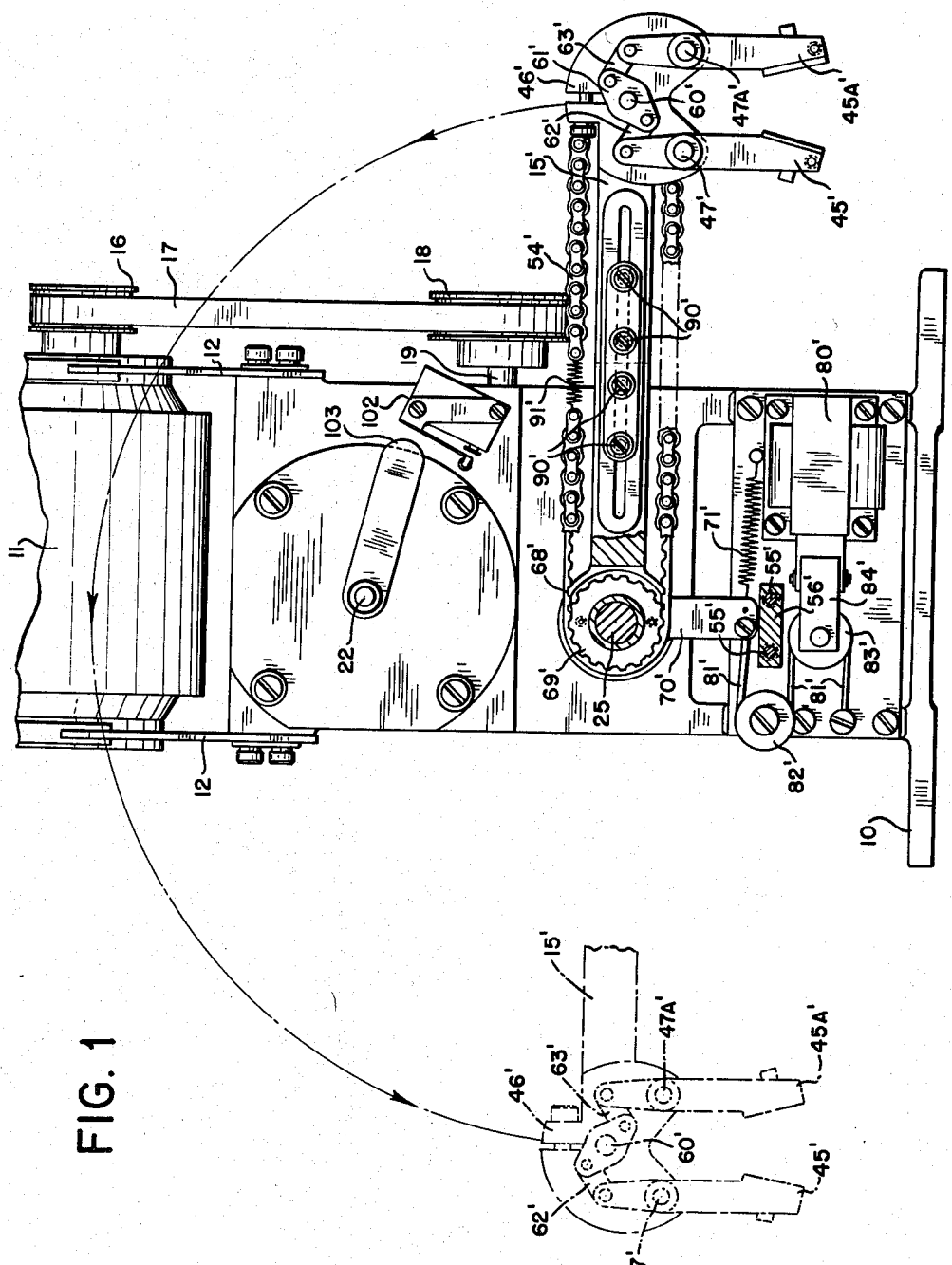
FIG. 1 is a side elevation view of the article manipulator apparatus provided by the present invention.
Figure 2:
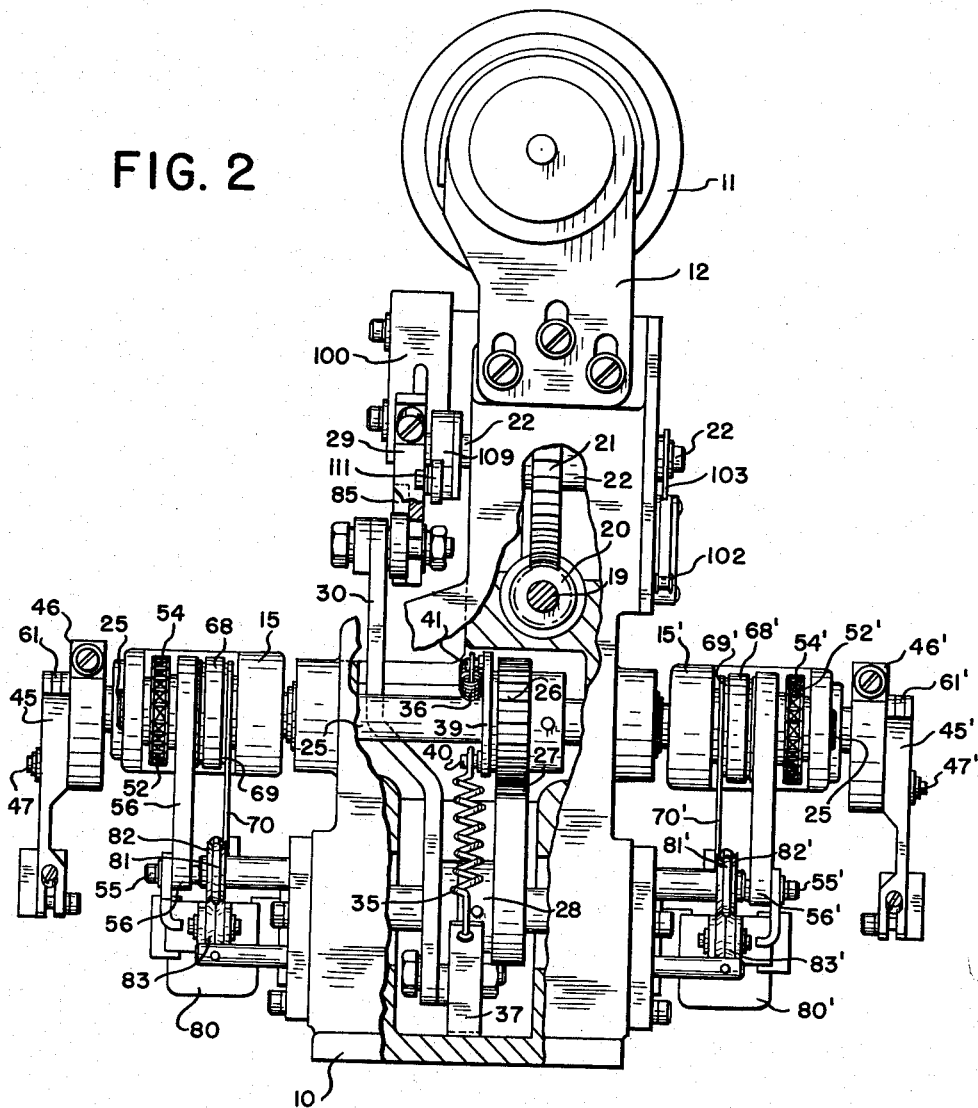
FIG. 2 is an end elevation view of the apparatus shown in FIG. 1.

Referring to the several figures, wherein like parts are identified with like numerals, the apparatus provided by the present invention includes a base frame support 10 with a drive motor 11 mounted at the top thereof and supported by brackets 12. Drive power is coupled from motor 11 to transfer arms 15 and 15' via pulley 16, timing belt 17, pulley 18 and drive shaft 19. The rotational speed of shaft 19 is further reduced by worm 20 and worm gear 21. Worm gear 21 is coupled to shaft 22 which is continuously rotated when the drive motor 11 is electrically energized. The innermost ends of arms of 15 and 15' are securely clamped to drive shaft 25 and are driven through an arcuate path of travel (e.g., 180° in rotation) by gear 26, engaged with gear sector 27, and crank arms 28 and 29 which are mechanically coupled as shown by link 30. Link 30 is pivotally attached at opposite ends thereof to crank arms 28 and 29, respectively. Thus continuous rotation of arm 29 clamped to shaft 22, as shown, causes gear sector 27 to be alternately driven in clockwise and counter-clockwise directions. Accordingly, arms 15 and 15' are caused to rotate in oscillatory fashion through an arcuate path of travel between forward and rearward end positions, as shown in FIG. 1. Since the arms are driven in rotation by a pair of crank arms as illustrated, it will be appreciated that the arm motion is harmonic with the velocity of travel approaching zero at the respective end points where reversal of travel direction occurs. The inherent advantages of this type of motion in an article manipulator device will be discussed in greater detail below.

Springs 35 and 36 (FIG. 4), anchored to the main support base at 37 and 38 and to drive shaft 25 via clamp member 39 and pins 40, 41, respectively, are provided to absorb the kinetic energy of the arms 15, 15', as the arms move to the end positions (horizontal) of travel. The springs are positioned so that each is in tension when the arms are driven to the end points of travel and accordingly vibration at the pickup position or article release position is reduced to a minimum and positioning accuracy is thereby enhanced.

Work jaws comprising grasping fingers 45, 45A are mounted at the end of each jaw on supporting plates 46, 46' and pivotally supported thereon by pins 47, 47A. Plate 46 is supported at the outer end of arm 15 by shaft 50 which is, in turn, rotatably mounted within bearings 51, 51A as shown in FIG. 5. Thus the entire jaw assembly including plate 46 and jaws 45, 45A rotate as a unit on shaft 50.

In accordance with the preferred embodiment of the present invention, jaws 45, 45A are maintained in a fixed vertical orientation as the arm is driven through its entire path of travel (e.g., 180°). Thus an article picked up at one end of the arm travel at some predetermined angle with respect to a horizontal reference plane (e.g., vertical) is maintained in the same orientation throughout the arcuate path of travel and hence will be released at the opposite end of the travel with the same relative orientation with respect to the horizontal reference plane. This fixed jaw orientation is achieved by a drive mechanism including sprocket gears 52, 53, and a connecting sprocket chain 54. As illustrated in FIG. 5, sprocket gear 52 though mounted on shaft 25 is in no way connected to that shaft but, rather, is anchored to base support 10 via bolt 55 and clamp member 56. Sprocket gear 53, on the other hand, is clamped to shaft 50 which is pivotally supported at the outer end of arm 15 in bearings 51 and 51A. Gears 52 and 53 have the same number of teeth. Accordingly, as arm 15 is driven through the arcuate path of travel, sprocket gear 53 is driven by chain 54 at the same angular rate of travel as that of the arm. However, the jaw support plate 46 and shaft 50 are rotated in an opposite direction to that of the arm drive shaft and hence the jaws are maintained in a fixed position with respect to a given reference plane (e.g., horizontal). It will be apparent to those skilled in the art that any desired relative motion between the jaw plate 46 and the arm 15 may be obtained by merely changing the tooth ratios of 52 and 53. By utilizing a one-to-one ratio, the grasping jaws are maintained in a fixed position throughout the arm path of travel.

In accordance with one featured aspect of the invention, the grasping jaws may be actuated at any desired angular position of the pickup arms. Grasping jaws 45 and 45A are closed by rotating shaft 60 in a clockwise direction. The upper ends of the jaws 45, 45A are caused to pivot outwardly by crank 61 which is secured to shaft 60 and, in turn, to grasping fingers 45, 45A by links 62 and 63, respectively. As illustrated in FIG. 5, shaft 60 is supported within tubular shaft 50 by bearings 65, 66, and is free to rotate independently of shaft 50. The grasping fingers are then opened and closed by the rotation of shaft 60 with timing gear 67. Timing gear 67 is driven in rotation by timing belt 68 and timing gear 69. Timing gear 69 is also supported on drive shaft 25 but is in no way connected to this shaft. Timing gear 69 is rotatably driven through the required angular rotation to close grasping fingers 45, 45A by crank arm 70. Crank arm 70 is maintained at a normal rest position corresponding to jaws open position by spring member 71 attached at one end to crank arm 70 and at the other end to the frame base 10. Grasping jaws 45, 45A are closed by electrically energizable solenoid 80 acting upon belt 81 which is anchored at one end to arm 70 as shown and at the opposite end to base 10. Belt 81 passes over pulley 82 which is supported on base 10 and over movable pulley 83 supported on the armature 84 of solenoid 80. Thus energization of solenoid 80 causes the timing belt to drive the shaft 60 in the clockwise direction and hence causes the lower tips of the article grasping jaws 45, 45A to close.

Where it is desired, the grasping jaws 45, 45A may be set to a normally closed position by simply changing the angular position of shaft 60 and pulley 67 with respect to the angular position of pulley 69. Energization of solenoid 80 then causes the timing belt 68 to drive the jaws from a normally spring-loaded closed position to an open position. This mode of operation is particularly useful in transferring articles that can be more readily picked up by expanding jaws.

Since the timing gears 67 and 69 are both free to rotate independently of the shafts 25 and 50, it will be appreciated that the grasping jaws can be closed or relaxed at any predetermined desired position of the transfer arm. As indicated above, spring 71 is provided to maintain the grasping jaws in a normally open position. The jaws are closed by electrically energizing solenoid 80.

In the preferred illustrated embodiment of the invention, the manipulator apparatus is shown with two arms which are supported and driven by a common shaft 25. It will be apparent to those skilled in the art that the invention is not limited to any specific number of arms but, rather, may include any desired number operating cooperatively in unison as described above.

Further, it will be apparent that the arcuate path of travel may be restricted as desired to any angular displacement less than 360°. The total path length is determined by the gear ratios of sector gear 27 and drive gear 26 and by the relative lengths of arms 29 and 28. Slot 85 is provided in arm 29 so that slight adjustments may be made in the overall path lengths. The path of travel may be shortened by clamping the bearing support for the upper end of arm 30 nearer the bottom of slot 85, thus effectively shortening the arm length 29.

The lengths of arm 15, 15′ may be extended by increasing the lengths of chains 54, 54′ and the lengths of timing belts 68, 68′. At the same time, the arm members 15, 15′ may be increased in length by loosening clamp screws 90 and moving the outermost end of arm 15 or 15′ to an extended position and then re-tightening clamp screws 90′. The ends of sprocket chains 54, 54′ are advantageously coupled together by spring members 91′ as shown in FIG. 1 which permits a certain amount of adjustment in arm length without requiring a change of the entire chain drive 54.

A schematic diagram of a preferred control circuit for electrically energizing solenoid 80, drive motor 11 and associated cooperating machines is shown in FIG. 6. The circuits illustrated therein are adapted to receive control signals from cooperating machines which in effect make the manipulator apparatus a slave controlled device, or in the alternative the electrical control circuit may be utilized to transmit position control signals to external machines so as to make those machines slave operated on a time coordinated basis by the manipulator apparatus. The control elements, except for the drive motor and several position sensing microswitches, are all advantageously located in a separate control cabinet (not shown) and connected to the manipulator apparatus via a multiconductor control cable.

The control circuit shown in FIG. 6 provides as a part of the present invention, means for programming the arm motion and the jaw action in several different ways to satisfy various operating conditions. Control means are provided for programming the arm to dwell for a fixed time interval at the end of each transfer operation, to stop at the end of each transfer operation, or as a third possibility to continuously run through the end positions of travel and immediately start on a return transfer operation. Switch means are provided for independently programming the arm cycle action at each end of the transfer operation. Thus the rear position of travel may be programmed to dwell, for example, whereas the forward position may be programmed to stop position.

In like manner, switch control means are provided for programming the jaw action so that the pickup jaws may be closed or opened at each end of arm travel or the action may be programmed so that jaw action is controlled by some external means. Although the control circuit as illustrated in FIG. 6 is adapted to function with manipulator apparatus as illustrated in FIGS. 1–5, wherein only two arms are provided, it will be apparent that the circuit control features may be readily extended to function with manipulator apparatus having more than two arms.

Referring to FIG. 6, it will be seen that the only electrical components mounted on the manipulator apparatus (enclosed within the dotted line) include A.-C. motor 11, jaw actuating solenoids 80, and 80′, rear position sensing microswitch 100 and forward position sensing microswitch 101. Additionally, a horizontal position sensing microswitch 102 is mounted on the machine to identify the position of the transfer arm at any predetermined position of travel intermediate the forward and rearward positions. As shown in FIG. 1, microswitch 102 is mounted on the main frame 10 at any predetermined intermediate position and is actuated by cam lever 103 which is driven in rotation by shaft 22. Switch 102 is a single pole double throw switch which may be utilized to stop or start externally cooperating machines at any predetermined position of the transfer arms. Microswitches 100 and 101 are also mounted on the frame 10 as illustrated in FIG. 4 and are actuated by adjustable cams 110 and 111, respectively. Cams 110 and 111 are supported on shaft 22 by cam arm 109 which is mechanically phased to actuate switches 100 and 101 when the arms reach the rearward and forward positions of travel, respectively (see FIG. 4). The transfer arm action is programmed by the cooperative action of the rearward and forward position sensing microswitches 100 and 101 and the setting of arm action switches 112 and 113. Switches 112 and 113 are double-pole triple position switches which may be set to a "stop" position, a "run" position (center position) and a "dwell" position as indicated in the legend at the bottom of FIG. 6. The operations for each of the programmed positions will now be described in detail.

A.-C. power is supplied to motor 11 via double-pole double-throw on-off switch 120. For purposes of explanatory convenience, the respective sides of the A.-C. line are identified as A.-C. plus (+) and A.-C. minus (−), as indicated. The A.-C. minus side of the line is connected directly to the lower terminal of induction motor 11 and the plus A.-C. side of the line is connected to the upper and middle terminals of the induction motor via the normally closed contacts of microswitches 100 and 101 connected in series as shown. When the A.-C. switch 120 is closed to the "on" position, A.-C. power is applied to the charging diode 121, the anode of which is connected to motor 11 as shown. Diode 121 functions to charge capacitor 124 to a plus D.-C. potential and when the D.-C. potential on 124 reaches the pull-in voltage for relay coil 125, relay 125 is caused to close. With the closure of relay 125, the positive D.-C. voltage developed across capacitor 124 is applied to the outer "dwell" and "stop" terminals of arm action switches 112 and 113 via coupling diodes 126 and 127. When switches 112 and 113 are set to the "stop" position, the D.-C. voltage on 124 is connected to the armature terminal 130 of motor 11 via conductor 131 and the contacts of either switch 100 or 101 as the arm is moved to the rearward or forward positions, respectively. It will be noted that upon the closing of either switch 100 or 101, the plus A.-C. side of the line is disconnected from the armature of motor 11 and the plus D.-C. voltage is connected to the armature winding instead. Upon the application of D.-C. voltage to the armature of motor 11, the motor is caused to stop very suddenly and, accordingly, the transfer arm is brought to a stop position at either the rearward or forward positions of travel. The stop time is preferably made relatively short (e.g., 100 milliseconds). In operating practice the stop time would ordinarily be made sufficiently long to accommodate either opening or closing of the pickup jaws. In the circuit diagram shown in FIG. 6, this stop time is determined by the discharge time of capacitor 124 through relay coil 125, resistor 125A and the winding resistance of the armature for motor 11. The discharge of capacitor 124 causes relay 125 to drop out and the capacitor 124 is thereby disconnected from the arm action switches 112 and 113 as described above. Motor 11 remains in the stopped position until such time as the start common is momentarily switched to either the "start forward" or "start rear" terminals indicated on the terminal board connections at the left of FIG. 6. This switching operation is ordinarily performed by external machines.

In practice, the motor 11 may be started at any time following the dropout of relay 125 with the momentary connection of the start common to the "start rear" or "start forward" connections on the terminal board. Plus A.-C. voltage is thus applied to the armature of motor 11 via the closed contacts of microswitch 100 or 101 sensing either the rearward or the forward position of the transfer arm. Following the momentary application of A.-C. common to motor 11, the rearward or forward position microswitch that had been actuated is then restored to the normally closed position as shown in FIG. 6 and plus A.-C. voltage is applied to the armature continuously until the arm is once more returned to an end delivery or pickup position.

Motor 11 may also be re-started from a stopped rearward or forward arm position by depression of push button switch 140. The starting common voltage of plus side of the A.-C. line is supplied to start switch 140 via contacts 125B of relay 125 when relay 125 is in the de-energized condition. Contacts 125C, which comprise a single-pole, double-throw switch, may be utilized to produce control signals at the respective forward and rearward arm positions. These signals may be utilized to control or synchronize the operation of companion machines.

When the arm action switches 112 and 113 are preset to the "run" position, plus A.-C. voltage is momentarily removed from the armature of motor 11 by the opening of either the rear position microswitch 100 or the forward position microswitch 101, but a D.-C. braking voltage is never applied to the motor. Thus motor 11 is allowed to coast through the end positions of travel but the arm is neither allowed to dwell at either end of travel nor is it caused to stop for any finite period of time. Thus the "run" position of operation is substantially a continuous mode of operation and the arm is caused to cyclically move through the arcuate path of travel from the rear position to the forward and back to the rear position and so on without interruption.

When either "arm action" switch 112 or 113 is set to the "dwell" position, arm action is halted for a fixed time interval at that end of travel. As described above, motor 11 is brought to a sudden halt with the application of the D.-C. voltage on capacitor 124 through diodes 126 or 127 and conductor 131 to the armature terminal 130. In this mode of action, however, the A.-C. start common is automatically restored to the motor winding by contacts 125B on relay 125 (when that relay drops out) and the lower contacts of 112 and 113. Thus in the "dwell" position, the motor 11 is halted by the application of D.-C. voltage to motor 11 and the total dwell time amounts to the relay drop-out time plus the motor start time. When both "arm action" switches are set to the dwell position, the article manipulator apparatus will be caused to repeatedly run through the entire operating cycle which includes a predetermined dwell time at each end of the arm travel. This action is to be contrasted with the "stop" programming where external switching operation is required in order to re-start the drive motor and run the manipulator apparatus through another cycle of operation. It is also to be contrasted with the "run" action wherein susbtantially no dwell time is provided at the end of arm travel. It will be appreciated that since separate program switches 112 and 113 are provided to program arm action for the rearward and forward positions, respectively, each arm may be programmed differently for each position.

As indicated above the pickup jaws for the respective arms are actuated by solenoids 80 and 80'. Since the jaw actuating mechanism is spring-loaded to a normally open position, the jaws are closed only with the application of an A.-C. voltage to the respective solenoids 80 and 80'. The lower terminals of solenoids 80 and 80' are returned to the plus A.-C. line and the upper terminals are switched as required to satisfy any desired work program. Thus the jaws may be opened or closed as required at either the forward or rearward end of the travel paths and each jaw may be programmed independently of the other. Where the jaw action is to be controlled by external switching means which may be actuated by other cooperating machines, the minus A.-C. side of the line is switched to either the external jaw forward terminal or the external jaw rear terminal at any desired time during the operating cycle.

With the jaw action switches set in the center or open positions, neither set of jaws will be operated throughout the operating cycle but rather will remain opened.

In normal operation, where it is desired to have the jaws operating simultaneously, the upper terminals of solenoids 80 and 80' are jumpered together as indicated by the dotted lines so as to be connected in parallel, and the jaw action switches may then be set to the desired positions (either close, open, or external). In this mode of operation, both jaws will operate similarly and in unison, i.e., both will be closed when relay 160 is energized and both will be open when relay 160 is de-energized (or the reverse sequence according to the settings of switches 150 and 151). Relay 160 is energized and closed when the forward microswitch 101 is actuated by the arm thereby disconnecting the switch arm from the plus A.-C. side of the line. The upper terminal of relay coil 160 is then connected to the minus A.-C. side of the line through motor 11 via coupling diode 161. Relay 160 is then latched in the energized position via contacts 160A which return the upper terminal of 160 to the minus A.-C. side of the line. Both jaws are released (or the reverse sequence according to the settings of switches 150 and 151) with the actuation of the rear microswitch 100 which effectively disconnects the lower terminal of coil 160 from the plus A.-C. side of the line. Contacts 160C comprising a single-pole double-throw switch may be utilized as required to control external machines.

In certain instances where it is desired to operate the pickup jaws on the separate arms individually, the jumpers connecting the respective solenoids 80 and 80' in parallel are removed and the separate "jaw action" switches 150 and 151 function to energize 80' when the arm is in the rear position and energize 80 when it is in the forward position. The upper terminals of 80 and 80' may be reversed causing 80' to be energized when the arm is in the forward position and causing 80 to be energized when the arm is in the rear position.

In order to minimize arc suppression across the respective jaw actuating solenoids 80 and 80', back-to-back arc suppression diodes 170 and 171 are advantageously connected in shunt with the respective solenoids. In like manner back-to-back arc suppression diodes 172 are advantageously connected across the windings of motor 11 as shown. Arc suppression across microswitches 100 and 101 is effected by capacitor 122 and resistor 123.

As indicated in FIG. 6 the D.-C. voltage from the capacitor 124 is also supplied to terminal Z via coupling diode 173. Drive motor 11 may be quickly stopped by an external interlock switch arranged to connect terminal Z to terminal Y thereby applying the D.C. voltage directly to the armature winding of motor 11. The external interlock or emergency stop switch is also arranged to disconnect the plus A.-C. side of the power line from terminal Y. The emergency quick stop feature is particularly useful as a safety feature when the article manipulator apparatus is utilized with the other machines that may be halted in operation due to malfunction. Another important operational application of the emergency quick-stop feature resides in the ability to stop and restart the arm motion at any point in the operating cycle without disturbing the work program. This means that when operating with other equipment (e.g., a parts feeder) wherein failure to present a part to the pickup point is sensed, the arm can be stopped above the pickup station to await the arrival of the part. Once delivery of the part has been sensed, the operating cycle may be immediately resumed. As a further example, when the apparatus is being used to place a part into a nest on an index table, the arm can be stopped and poised above the table to await the arrival of the nest underneath. This feature is operationally advantageous because in existing equipment it is necessary to stop the transfer apparatus at an end position of travel since it is not possible to stop the device in the middle of its stroke without disturbing the programmed operating cycle.

It will be appreciated by those skilled in the art that the electro-mechanical apparatus provided by the present invention features extreme simplicity in that driving clutches, brakes, dash-pots and the like are completely eliminated and the electrical control circuits are both flexible and simple. As explained above, both the "arm action" and "jaw action" may be either internally programmed or either action may be externally controlled by cooperating machines which may be adapted with simple switching devices to initiate "pickup," "transfer," and "put-down" actions.

While the present invention has been particularly shown and described with reference to a preferred embodiment thereof, it will be understood by those skilled in the art that various changes in form and details may be made therein without departing from the spirit and scope of the invention as defined in the claims.

What is claimed is:

1. Automatic article manipulator apparatus comprising a support base, a transfer arm pivotally supported adjacent one end thereof by a drive shaft on said base, said arm being disposed for movement in opposite directions of rotation through an arcuate path to forward and rearward end positions of travel, said arcuate path of travel being less than 360° of rotation, energizable means for rotating said drive shaft in harmonic motion so that the arm rotational velocity approaches zero at said forward and rearward positions of travel, article grasping jaws mounted on a rotatable plate supported by said arm at a point removed from said drive shaft, said jaws being adapted for actuation to pickup articles to be transferred in position, means coupled between said base and said plate for maintaining said grasping jaws at a predetermined fixed angle of orientation with respect to said base throughout the arm's arcuate path of travel, first pulley means pivotally mounted on said plate and adapted to close said jaws when driven in rotation, second pulley means pivotally mounted on said base, belt means coupling said first and second pulleys, and selectively operable means mounted on said base for rotating said second pulley through a predetermined angle of rotation at any point throughout the arcurate path of travel for said arm and independently of the movement of said drive shaft to actuate said grasping jaws.

2. Automatic article manipulator apparatus comprising a support base, a transfer arm pivotally supported adjacent one end thereof by a drive shaft on said base, said arm being disposed for movement in opposite directions of rotation through an arcuate path to forward and rearward end positions of travel, said arcuate path of travel being less than 360° of rotation, electrically energizable means for rotating said drive shaft in harmonic motion so that the arm rotational-velocity approaches zero at said forward and rearward positions of travel, article grasping jaws mounted on a rotatable plate supported by said arm at a point removed from said drive shaft, said jaws being adapted for actuation to pickup articles to be transferred in position, means coupled between said base and said plate for maintaining said grasping jaws at a predetermined fixed angle of orientation with respect to said base throughout the arm's arcurate path of travel, first pulley means pivotally mounted on said plate and adapted to close said jaws when driven in rotation, second pulley means pivotally mounted on said base, belt means coupling said first and second pulleys, and a selectively operable electrically energizable solenoid mounted on said base, said solenoid having a movable armature mechanically coupled to said second pulley and being adapted to rotate said second pulley when electrically energized to actuate said grasping jaws and independently of the movement of said drive shaft.

3. Automatic article manipulator apparatus comprising a support base, a transfer arm pivotally supported adjacent one end thereof by a drive shaft on said base, said arm being disposed for movement in opposite directions of rotation through an arcuate path to forward and rearward end positions of travel, said arcuate path of travel being less than 360° of rotation, electrically energizable means for rotating said drive shaft in harmonic motion so that the arm rotational velocity approaches zero at said forward and rearward positions of travel, said means including an induction motor, an A.-C. voltage source, a D.-C. voltage source, first switch means adapted to connect said motor to said A.-C. voltage source to rotate said arm through an arcuate path of travel, second, selectively operable switch means adapted to disconnect said motor from said A.-C. voltage source and connect it to said D.-C. voltage source to stop the rotation of said drive shaft and arm at either or both end positions of travel of said arm, selectively operable control means for automatically reconnecting said motor to said A.-C. source after a predetermined length of time, article grasping jaws mounted on a rotatable plate supported by said arm at a point removed from said drive shaft, said jaws being adapted for actuation to pickup articles to be transferred in position, means coupled between said base and said plate for maintaining said grasping jaws at a predetermined fixed angle of orientation with respect to said base throughout the arm's arcuate path of travel, first pulley means pivotally mounted on said plate and adapted to close said jaws when driven in rotation, second pulley means pivotally mounted on said base, belt means coupling said first and second pulleys, and means mounted on said base for rotating said second pulley through a predetermined angle of rotation, said means being selectively operable at any point throughout the arcuate path of travel for said arm and independently of the movement of said drive shaft to close said grasping jaws.

4. Automatic article manipulator apparatus comprising a support base, a transfer arm pivotally supported adjacent one end thereof by a drive shaft on said base, said arm being disposed for movement in opposite directions of rotation through an arcuate path to forward and rearward end positions of travel, said arcuate path of travel being less than 360° of rotation, electrically energizable means for rotating said drive shaft in harmonic motion so that the arm rotational velocity approaches zero at said forward and rearward positions of travel, said means including an induction motor, an A.-C. voltage source, a D.-C. voltage source, first switch means adapted to connect said motor to said A.-C. voltage source to rotate said arm through an arcuate path of travel, second, selectively operable switch means adapted to disconnect said motor from said A.-C. voltage source and connect it to said D.-C. voltage to stop the rotation of said drive shaft and arm at either or both end positions of travel of said arm, selectively operable control means for automatically reconnecting said motor to said A.-C. source after a predetermined length of time, article grasping jaws mounted on a rotatable plate supported by said arm at a point removed from said drive shaft, said jaws having a normally open release position and being adapted to be actuated to a closed pick-up position, means coupled between said base and said plate for maintaining said grasping jaws at a predetermined fixed angle of orientation with respect to said base throughout the arm's arcuate path of travel, first pulley means pivotally mounted on said plate and adapted to close said jaws when driven in rotation, second pulley means pivotally mounted on said base, belt means coupling said first and second pulleys, and a selectively operable electrically energizable solenoid mounted on said base, said solenoid having a movable armature mechanically coupled to said second pulley and being adapted to rotate said second and first pulleys when electrically energized to close said grasping jaws at any point throughout the arcuate path of travel of said arm and independently of the movement of said drive shaft.

5. Automatic article manipulator apparatus comprising a support base, a transfer arm pivotally supported adjacent one end thereof by a drive shaft on said base, said arm being disposed for movement in opposite directions of rotation through an arcuate path to forward and rearward end positions of travel, said arcuate path of travel being less than 360° of rotation, electrically energizable means for rotating said drive shaft in harmonic motion so that the arm rotational velocity approaches zero at said forward and rearward positions of travel, said means including an induction motor, an A.-C. voltage source, a D.-C. voltage source, first switch means adapted to connect said motor to said A.-C. voltage source to rotate said arm through an arcuate path of travel, second, selectively operable switch means adapted to disconnect said motor from said A.-C. voltage source and connect it to said D.-C. voltage source to stop the rotation of said drive shaft and arm at either or both end positions of travel of said arm, selectively operable control means for automatically reconnecting said motor to said A.-C. source after a predetermined length of time, article grasping jaws mounted on a rotatable plate supported by said arm at a point removed from said drive shaft, said jaws having a normally open release position and being adapted to be actuated to a closed pick-up position, means coupled between said base and said plate for maintaining said grasping jaws at a predetermined fixed angle of orientation with respect to said base throughout the arm's arcuate path of travel, and means operable at any point throughout the arcuate path of travel for said arm to close and open said grasping jaws.

6. Automatic article manipulator apparatus comprising a support base, a transfer arm pivotally supported adjacent one end thereof by a drive shaft on said base, said arm being disposed for movement in opposite directions of rotation through an arcuate path to forward and rearward end positions of travel, said arcuate path of travel being less than 360° of rotation, electrically energizable means for rotating said drive shaft in harmonic motion so that the arm rotational velocity approaches zero at said forward and rearward positions of travel, said means including an induction motor and control circuit means for energizing said motor, said circuit means comprising an A.-C. voltage source and a D.-C. voltage source with selectively operable switch means adapted to momentarily energize said motor with D.-C. voltage at either or both the forward and rearward positions of arm travel and to energize said motor with A.-C. voltage at all other times to drive said arm alternately between the forward and rearward positions of travel, article grasping jaws mounted on a rotatable plate supported by said arm at a point removed from said drive shaft, said jaws having a normally open release position and being adapted to be actuated to a closed pick-up position, means coupled between said base and said plate for maintaining said grasping jaws at a predetermined fixed angle of orientation with respect to said base throughout the arm's arcuate path of travel, and means operable at any point throughout the arcuate path of travel for said arm to close and open said grasping jaws.

7. Automatic article manipulator apparatus comprising a support base, a transfer arm pivotally supported adjacent one end thereof by a drive shaft on said base, said arm being disposed for movement in opposite directions of rotation through an arcuate path to forward and rearward end positions of travel, said arcuate path of travel being less than 360° of rotation, electrically energizable means for rotating said drive shaft in harmonic motion so that the arm rotational velocity approaches zero at said forward and rearward positions of travel, said means including an induction motor and control circuit means for energizing said motor, said circuit means comprising an A.-C. voltage source and a D.-C. voltage source with selectively operable switch means adapted to momentarily energize said motor with D.-C. voltage at either or both the forward and rearward positions of arm travel and to energize said motor with A.-C. voltage at all other times to drive said arm alternately between the forward and rearward positions of travel, article grasping jaws mounted on a rotatable plate supported by said arm at a point removed from said drive shaft, said jaws having a normally open release position and being adapted to be actuated to a closed pick-up position, means coupled between said base and said plate for maintaining said grasping jaws at a predetermined fixed angle of orientation with respect to said base throughout the arm's arcuate path of travel, first pulley means pivotally mounted on said plate and adapted to close said jaws when driven in rotation, second pulley means pivotally mounted on said base, belt means coupling said first and second pulleys, and means mounted on said base for rotating said second pulley through a predetermined angle of rotation, said means being selectively operable at any point throughout the arcuate path of travel for said arm and independently of the movement of said drive shaft to close said grasping jaws.

8. Automatic article manipulator apparatus comprising a support base, a transfer arm pivotally supported adjacent one end thereof by a drive shaft on said base, said arm being disposed for movement in opposite directions of rotation through an arcuate path to forward and rearward end positions of travel, said arcuate path of travel being less than 360° of rotation, electrically energizable means for rotating said drive shaft in harmonic motion so that the arm rotational velocity approaches zero at said forward and rearward positions of travel, said means including an induction motor and control circuit means for energizing said motor, said circuit means comprising an A.-C. voltage source and a D.-C. voltage source with selectively operable switch means adapted to momentarily energize said motor with D.-C. voltage at either or both the forward and rearward positions of arm travel and to energize said motor with A.-C. voltage at all other times to drive said arm alternately between the forward and rearward positions of travel, article grasping jaws mounted on a rotatable plate supported by said arm at a point removed from said drive shaft, said jaws having a normally open release position and being adapted to be actuated to a closed pick-up position, means coupled between said base and said plate for maintaining said grasping jaws at a predetermined fixed angle of orientation with respect to said base throughout the arm's arcuate path of travel, first pulley means pivotally mounted on said plate and adapted to close said jaws when driven in rotation, second pulley means pivotally mounted on said base, belt means coupling said first and second pulleys, and a selectively operable electrically energizable solenoid mounted on said base, said solenoid having a movable armature mechanically coupled to said second pulley and being adapted to rotate said second pulley when electrically energized to close said grasping jaws at any point throughout the arcuate path of travel of said arm and independently of the movement of said drive shaft.

9. Article manipulator apparatus in accordance with claim 8 wherein the means for maintaining said grasping jaws at a fixed angle of orientation includes a first sprocket gear attached to said rotatable plate, a second sprocket gear rotatably supported on said drive shaft and attached to said base, and chain means coupling said first and second sprocket gears.

References Cited by the Examiner
UNITED STATES PATENTS

| | | |
|---|---|---|
| 1,721,551 | 7/29 | Ferenci. |
| 1,811,832 | 6/31 | Mayers. |
| 2,784,364 | 3/57 | Gertin _____ 318—212 |
| 3,010,587 | 11/61 | Hollinger. |
| 3,066,786 | 12/62 | Allgeyer _____ 198—27 X |

HUGO O. SCHULZ, *Primary Examiner.*